United States Patent
Kaiho

(10) Patent No.: US 7,184,070 B2
(45) Date of Patent: Feb. 27, 2007

(54) EXPOSURE DEVICE INCLUDING HOUSING ROTATED ABOUT PROJECTION

(75) Inventor: Satoshi Kaiho, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 940 days.

(21) Appl. No.: 09/955,043

(22) Filed: Sep. 19, 2001

(65) Prior Publication Data

US 2003/0053151 A1    Mar. 20, 2003

(51) Int. Cl.
*B41J 2/435* (2006.01)
(52) U.S. Cl. ...................................... 347/263
(58) Field of Classification Search ........ 347/129, 347/228, 239–254, 256–261, 263, 152, 170, 347/231; 359/198; 396/7
See application file for complete search history.

(56) References Cited

U.S. PATENT DOCUMENTS

| | | | | |
|---|---|---|---|---|
| 4,265,524 A | * | 5/1981 | Compton et al. | 396/7 |
| 4,903,067 A | * | 2/1990 | Murayama et al. | 347/129 |
| 5,151,811 A | * | 9/1992 | Makino | 359/198 |
| 6,243,128 B1 | * | 6/2001 | Yamakawa | 347/263 |

FOREIGN PATENT DOCUMENTS

| | | | |
|---|---|---|---|
| JP | 04249211 A | * | 9/1992 |
| JP | 05119276 A | * | 5/1993 |
| JP | 10-197815 | | 7/1998 |

OTHER PUBLICATIONS

A partial English translation of JP 4-249211.

* cited by examiner

*Primary Examiner*—Hai Pham
(74) *Attorney, Agent, or Firm*—Foley & Lardner LLP

(57) ABSTRACT

An exposure device has a light emitting unit for emitting a laser beam based on an image signal. The laser beam emitted from the light emitting unit is incident on a polygon mirror through a cylindrical lens. The laser beam reflected on the polygon mirror is illuminated on the surface of a photo sensitive drum through two fθ lenses and a mirror. By doing so, an electrostatic latent image is formed on a drum surface on the basis of an image signal. Further, the exposure device has a housing for holding the light emitting unit, cylindrical lens, polygon mirror, fθ lenses and mirror in a mutually and highly accurate state. A dowel is so provided as to project from the bottom of the housing and functions as a rotation shaft for rotating the exposure device. The dowel is provided on an axis passing through an exposure light spot illuminated in the drum surface by the laser beam.

22 Claims, 5 Drawing Sheets

EXPOSURE DEVICE INCLUDING HOUSING ROTATED ABOUT PROJECTION

BACKGROUND OF THE INVENTION

The present invention relates to an exposure device incorporated into an image forming apparatus, such as a copier and printer, and, in particular, to a structure for adjusting the tilt of an exposure device relative to a photosensitive drum.

An image forming apparatus, such as a copier or printer, includes an exposure device for scanning, with exposure light, the surface of a photosensitive drum to form an electrostatic latent image on the drum surface. The exposure device includes a laser beam source for emitting a laser beam based on image data and a polygon mirror for deflecting the laser beam toward a main scanning direction to allow the drum surface to be scanned with the exposure light. That is, the laser beam is deflected toward the main scanning direction by rotating the polygon mirror and the electrostatic latent image based on the image data is formed on the drum surface by rotating the photosensitive drum in a sub-scanning direction.

In order to prevent a tilt from being produced on the electrostatic latent image formed on the drum surface, the tilt of the exposure device relative to the photosensitive drum is adjusted on shipment and installation of the device. In this case, in order to make a narrower linear exposure light spot which is formed on the drum surface by the laser beam scanned toward the main scanning direction parallel to the rotation shaft of the photosensitive drum, the exposure device as a whole is rotated about a predetermined rotation shaft.

If, in this way, the exposure device is rotated, it is possible to correct the tilt of the exposure light spot formed on the drum surface. However, the scanning start position corresponding to the end of the exposure light spot is also displaced toward the rotation shaft direction of the photosensitive drum, presenting a problem.

BRIEF SUMMARY OF THE INVENTION

The present invention is achieved with the above in view and the object of the present invention is to provide an exposure device which can correct the tilt of a narrower linear exposure light spot relative to a photosensitive drum without displacing, toward a main scanning direction, the linear exposure spot formed on the drum surface by the scanning of a laser beam.

In order to achieve the object of the present invention, an exposure device of the prevent invention comprises a light emitting section which emit a laser beam based on an image signal; a deflecting/scanning section which deflect the laser beam emitted from the light emitting section toward a main scanning direction and scanning, with the exposure light, an image carrier moved in a sub-scanning direction to form a latent image on the image carrier; an optical member which conduct the laser beam deflected by the deflecting/scanning section to the image carrier; and a rotation shaft located on an axis passing through a narrower linear exposure light spot illuminated on the image carrier by the laser beam conducted through the optical member, wherein the tilt of the exposure light spot relative to the image carrier is corrected by rotating the device about the rotation shaft.

Further, an image forming apparatus of the present invention comprises an image carrier moved in a sub-scanning direction; an exposure device which scan, with the exposure light, the image carrier along a main scanning direction to form a latent image on the image carrier; a developing unit which supply a toner to the latent image to effect development; a transfer unit which transfer a resultant toner image to a sheet; and a fixing device which fix the transferred toner image to the sheet, wherein the exposure device comprises a light emitting section which emit a laser beam based on an image signal; a deflecting/scanning section which deflect the laser beam emitted from the light emitting section toward the main scanning direction and scanning, with the exposure light, the image carrier to form a latent image on the image carrier; an optical member which conduct the laser beam defected by the deflecting/scanning section to the image carrier; and a rotation shaft located on an axis passing through a narrower linear exposure light spot illuminated on the image carrier by the laser beam conducted through the optical member, wherein the tilt of the exposure light spot relative to the image carrier is corrected by rotating the device about the ration shaft.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DETAILED DESCRIPTION OF THE INVENTION

An embodiment of the present invention will be described in more detail below with reference to the accompanying drawing.

Figure 1:
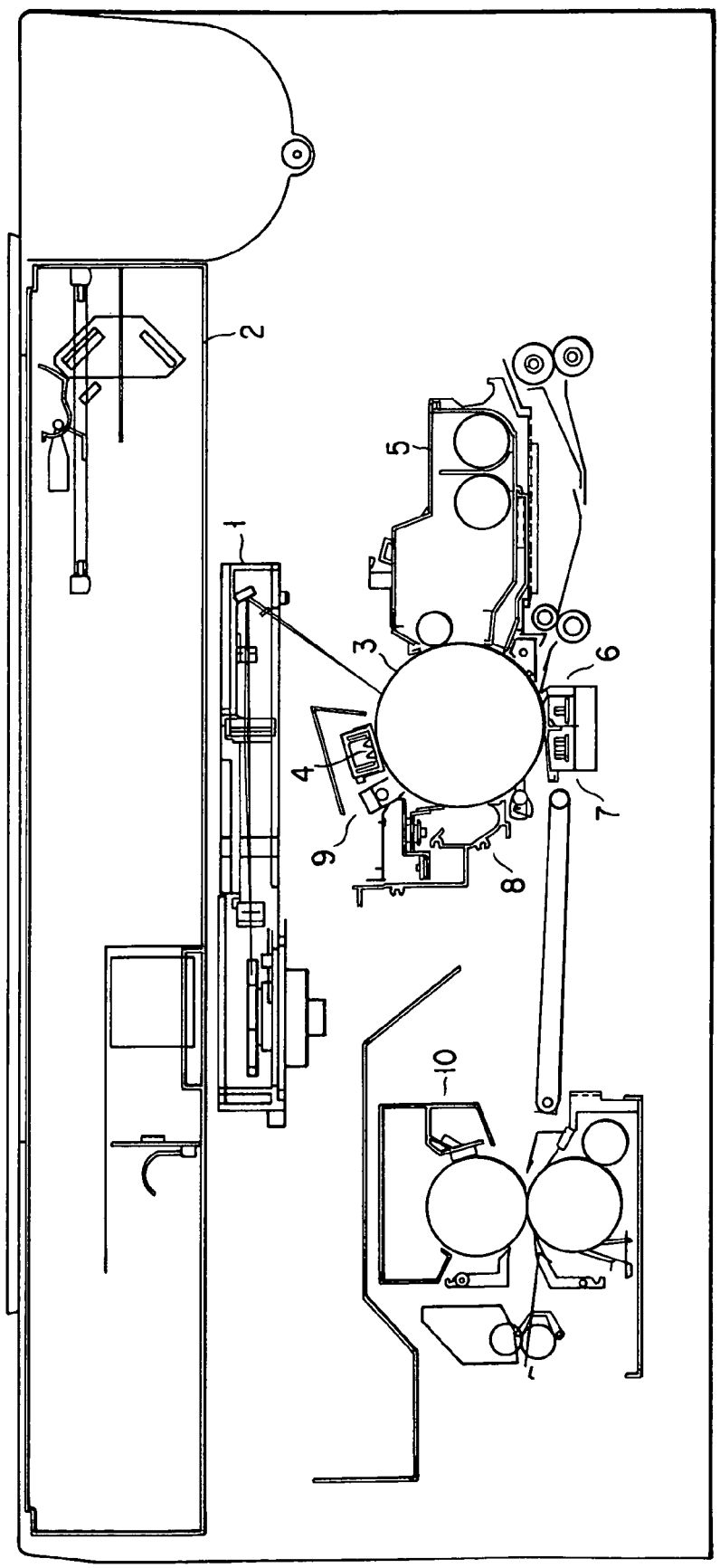
FIG. 1 is a diagrammatic view showing a digital copier according to an embodiment of the present invention.

FIG. 1 is a diagrammatic view showing a structure of a digital copier (hereinafter referred to simply as a copier) as an image forming apparatus of the present invention.

The copier has a scanner 2 for reading out a document image and outputting an image signal. A photosensitive drum 3 is provided below the scanner 2 and serves as an image carrier. Around the photosensitive drum 3 are provided a charger 4, an exposure device 1, developing unit 5, a transfer charger 6 (transfer unit), a separating charger 7, cleaner 8 and discharger 9. A fixing device 10 is provided on a left side of the photosensitive drum 3 in a spaced-apart position as viewed from FIG. 1.

The exposure device 1 emits a laser beam based on an image signal read out by the scanner 2 and scans, with exposure light, the surface of the photosensitive drum 3 rotating in a predetermined direction. The developing unit S supplies a toner onto an electrostatic latent image formed on the surface of the drum 3 with the exposure light and, by doing so, makes the latent image visible as a toner image. The transfer charger 6 transfers the toner image which is formed on the drum surface to a sheet, not shown. The separating charger 7 separates a toner image-transferred sheet from the drum surface. The cleaner 8 eliminates that toner left on the drum surface and the discharger 9 eliminates a residual electric charge on the drum surface. The fixing device 10 allows the sheet with the toner image transferred thereto to pass between a pair of rollers set in pressure contact with each other under the application of heat and, by doing so, the toner image on the sheet to be thermally fused and fixed to the sheet.

Now an explanation will be made in more detail about the above-mentioned exposure device 1 by referring to FIGS. 2 to 5.

Figure 2:
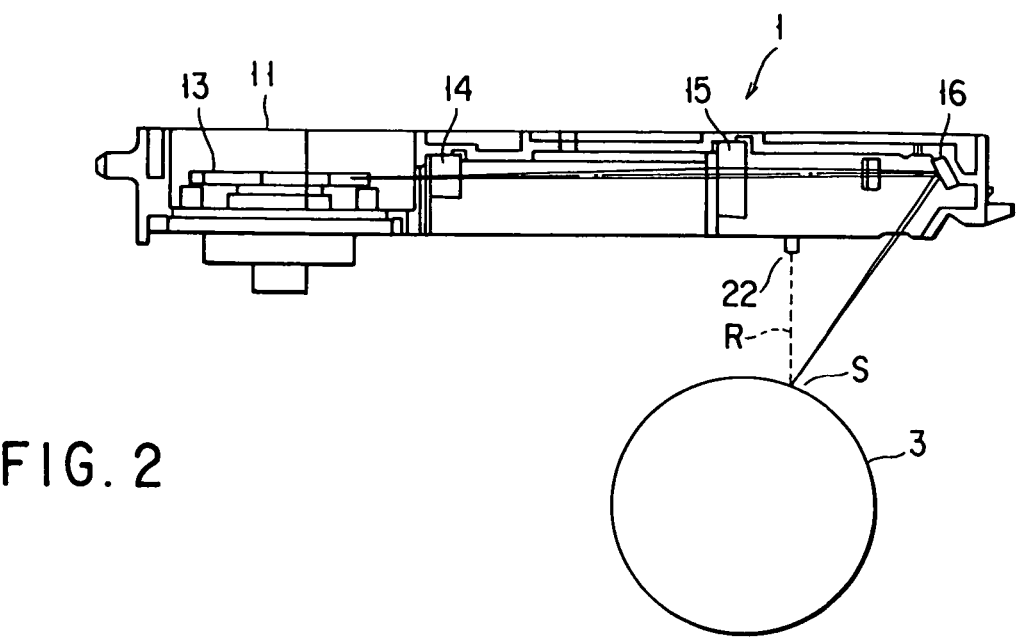
FIG. 2 is a front view showing an exposure device incorporated into the copier in FIG. 1.
Figure 3:
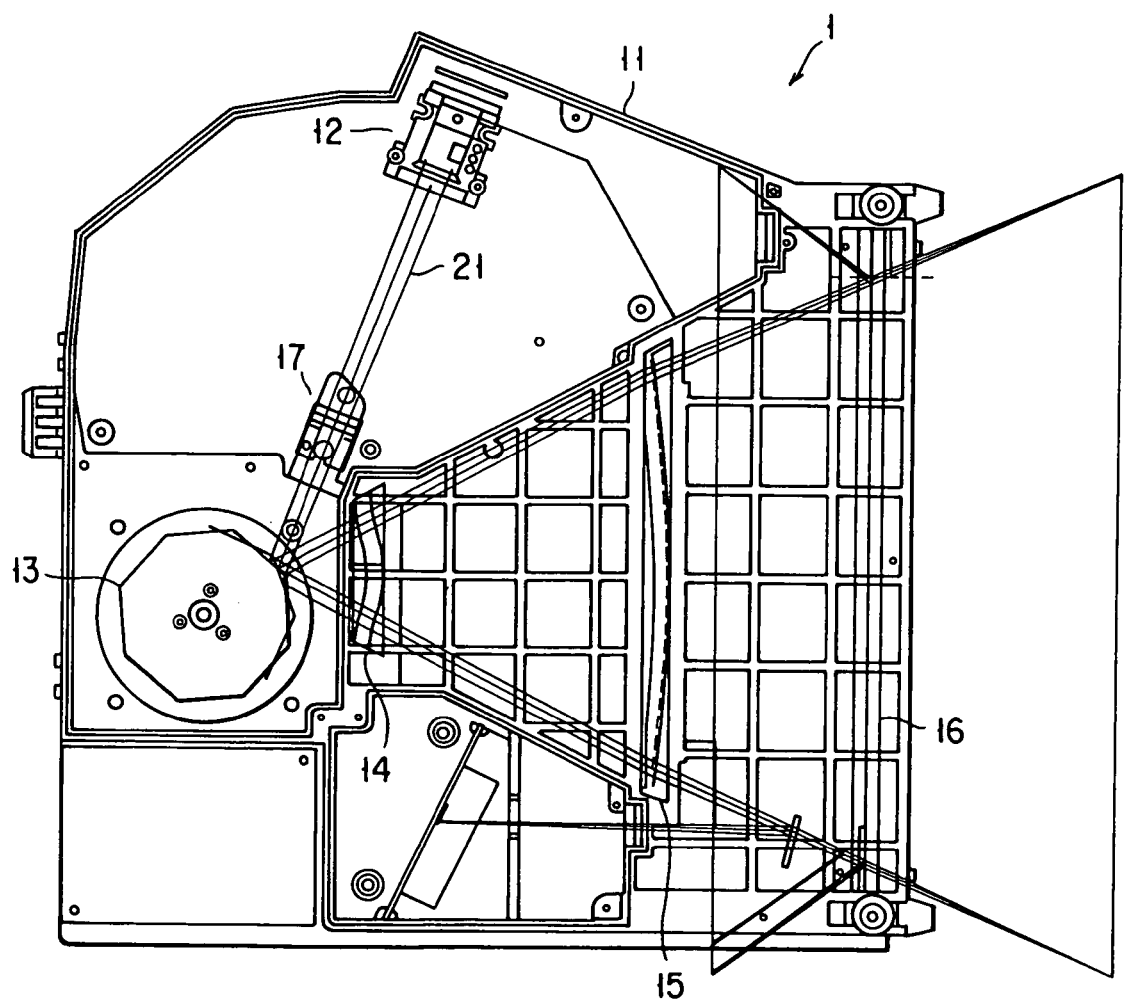
FIG. 3 is a plan view showing the exposure device in FIG. 2.

As shown in FIGS. 2 and 3, the exposure device 1 has a housing 11 constituting an outer shell of the device. At those predetermined positions located within the housing 11, a light emitting unit 12, a cylindrical lens 17, a polygon mirror 13, two Fθ lenses 14 and 15, and a mirror 16 are arranged in a mutually, highly accurate positional relation. The light emitting unit 12 functions as a light emitting section of the present invention, the polygon mirror 13 functions as a deflecting/scanning section of the present invention, the Fθ lenses 14, 15 and the mirror 16 function as optical members of the present invention.

Figure 4:
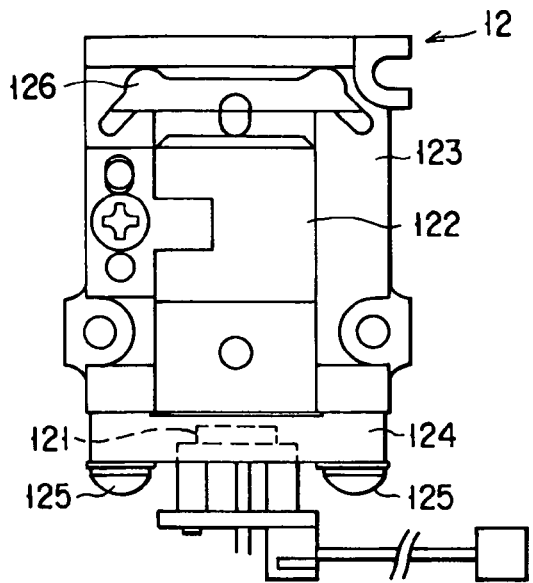
FIG. 4 is a plan view showing a light emitting unit incorporated into the exposure device in FIG. 3.
Figure 5:
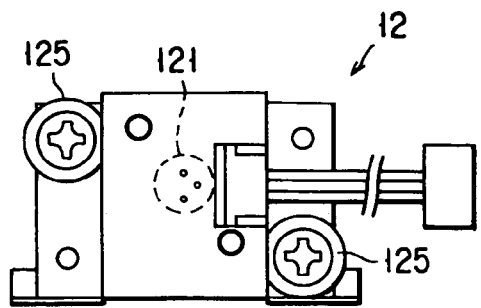
FIG. 5 is a back view of the light emitting unit of FIG. 4 as viewed from its back end side.

As shown in FIGS. 4 and 5, the light emitting unit 12 has a semiconductor laser element 121, a shaping lens 122 and a lens stop 126. The semiconductor laser element 121 emits a laser beam 21 (see FIG. 3) based on an image signal. The shaping lens 122 has a finite focal point lens and collimator lens which shape a cross-section of a laser beam. The stop 126 has an aperture for allowing the laser beam to pass through and its cross-section to be shaped. The shaping lens 122 is retained by a lens holder 123 made of a metal such as die-cast aluminum or plastic, such as polycarbonate. The semiconductor laser element 121 is retained by an LD holder 124 and fixed by screws 125 to the lens holder 123.

A laser beam 21 emitted from the light emitting unit 12 is incident on the polygon mirror 13 through the cylindrical lens 17. The laser beam 21 reflected on the polygon mirror 13 is defected toward a main scanning direction through the rotation of the polygon mirror 13 and, after passing through the two fθ lenses 14 and 15, reflected by the mirror 16 and directed onto the surface of the photosensitive drum 3 for illumination. At this time, an exposure light spot on the drum surface provides a narrower linear beam configuration extending toward the direction of a rotation shaft of the photosensitive drum 3, that is toward the main scanning direction. Further, by the rotation of the photosensitive drum 3 in a sub-scanning direction, an electrostatic latent image is formed on the surface of the drum. It is to be noted that the two fθ lenses 14 and 15 have the function of correcting a variation in the tilt of each reflection face of the polygon mirror 13.

Incidentally, the above-mentioned exposure device 1 is such that, in order to eliminate the tilt of an electrostatic latent image formed on the drum surface, the device has its mounting position adjusted upon shipment and installation of a copier by rotating the device about a predetermined rotation shaft together with its housing 11. At this time, the exposure device has its mounting position so adjusted as to allow a narrower linear exposure light spot which is illuminated by the laser beam on the surface of the drum to be made parallel to a rotation shaft of the photosensitive drum 3.

When the tilt of the exposure light spot was corrected by rotating the exposure device 1 as set out above, then the scanning start position corresponding to the end of the exposure light spot was also displaced toward the main scanning direction, thus presenting a problem. If the scanning start position of the laser beam is thus displaced, there also occurs a displacement in the electrostatic latent image formed on the drum surface and finally a displacement on an image outputted on to a sheet.

According to the present invention, therefore, the rotation shaft of the exposure device 1 is located on an axis passing through the exposure light spot formed on the drum surface and, by doing so, any displacement of the exposure light spot toward the main scanning direction is suppressed to a minimal extent. That is, as shown in FIG. 2, a dowel 22 projecting from the bottom of the housing 11 of the exposure device 1 is formed just above an axis R passing through the exposure light spot S on the drum surface and an associated hole, not shown, rotatably receiving the dowel 22 is formed on a frame side, not shown, of the copier.

Figure 6:
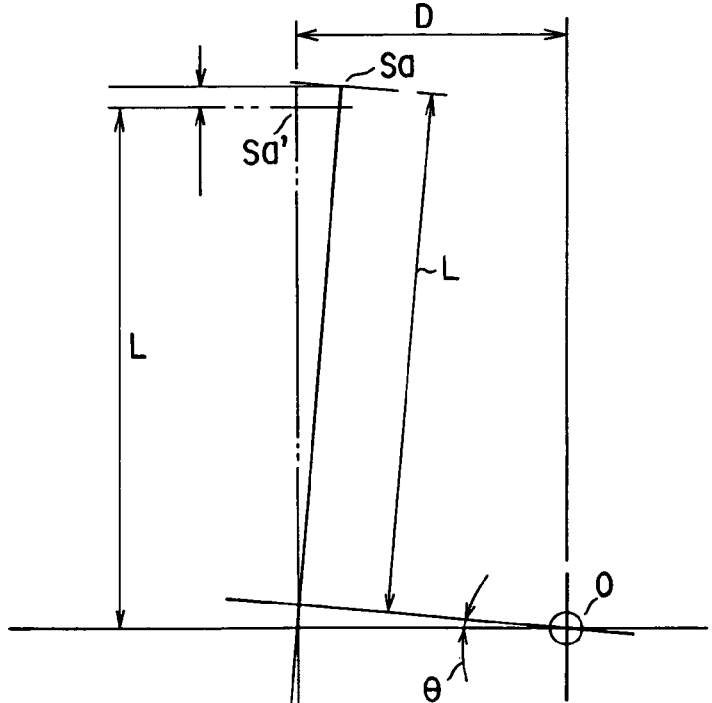
FIG. 6 is a view for explaining an example of an operation of correcting the tile of an exposure light spot on a drum surface by rotating the exposure device in FIG. 2.

With reference to FIG. 6, consideration will be given below to the displacement of an exposure light spot toward the main scanning direction in the case where the rotation shaft of the exposure device 1 is provided at any given position.

Here, it is assumed that the mounting angle of the exposure device 1 is so adjusted that, by rotating the exposure device 1 about a given rotation shaft O from a state in which an exposure light spot S formed on the drum surface is tilted by an angle θ with respect to the rotation shaft of the drum 3, a "corrected" exposure light spot S' is made parallel to the rotation shaft of the photosensitive drum.

In this case, an amount of displacement, Y, along the main scanning direction between a scanning start position Sa at the end of an "uncorrected" tilted exposure light spot S and a scanning start position Sa' at the end of a "corrected" exposure light spot S' is given by $$Y = D \sin θ + L (\cos θ - 1)$$

In the equation above, D represents a distance from an axis of the rotation shaft O to the exposure light point S (S') and L represents a distance from a middle of the exposure light spot S (S') along the main scanning direction to the scanning start position.

The distance D at which the amount of displacement, Y, is made minimal becomes O. That is, it is found that, by locating the rotation shaft of the exposure device 1 on the axis passing through the exposure light spot S formed on the drum surface to make, zero, the distance between the exposure light sport S and the rotation shaft O, it is possible to suppress, to a minimal value, the amount of displacement, Y, of the scanning start position along the main scanning direction after the tilt of the exposure light spot S has been corrected.

Figure 7:
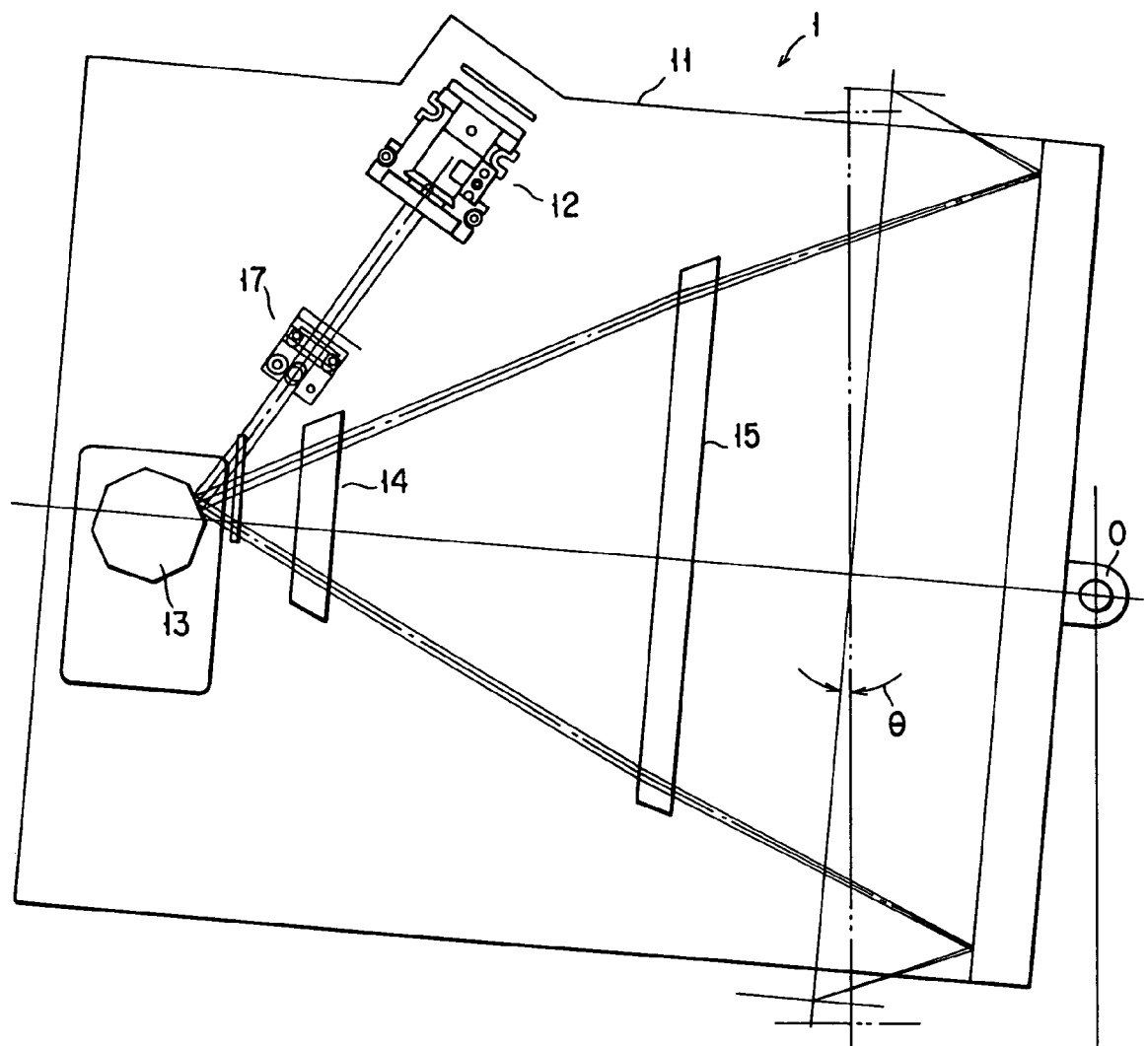
FIG. 7 is a view for explaining an amount of displacement of a scanning start position of an exposure light spot when a rotation shaft of the exposure device is set away from the exposure light spot.
Figure 7:
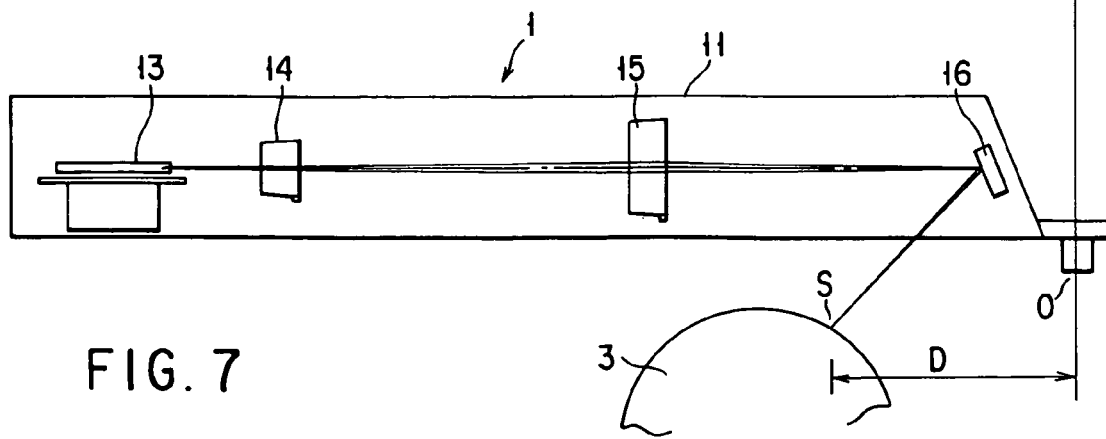
Figure 8:
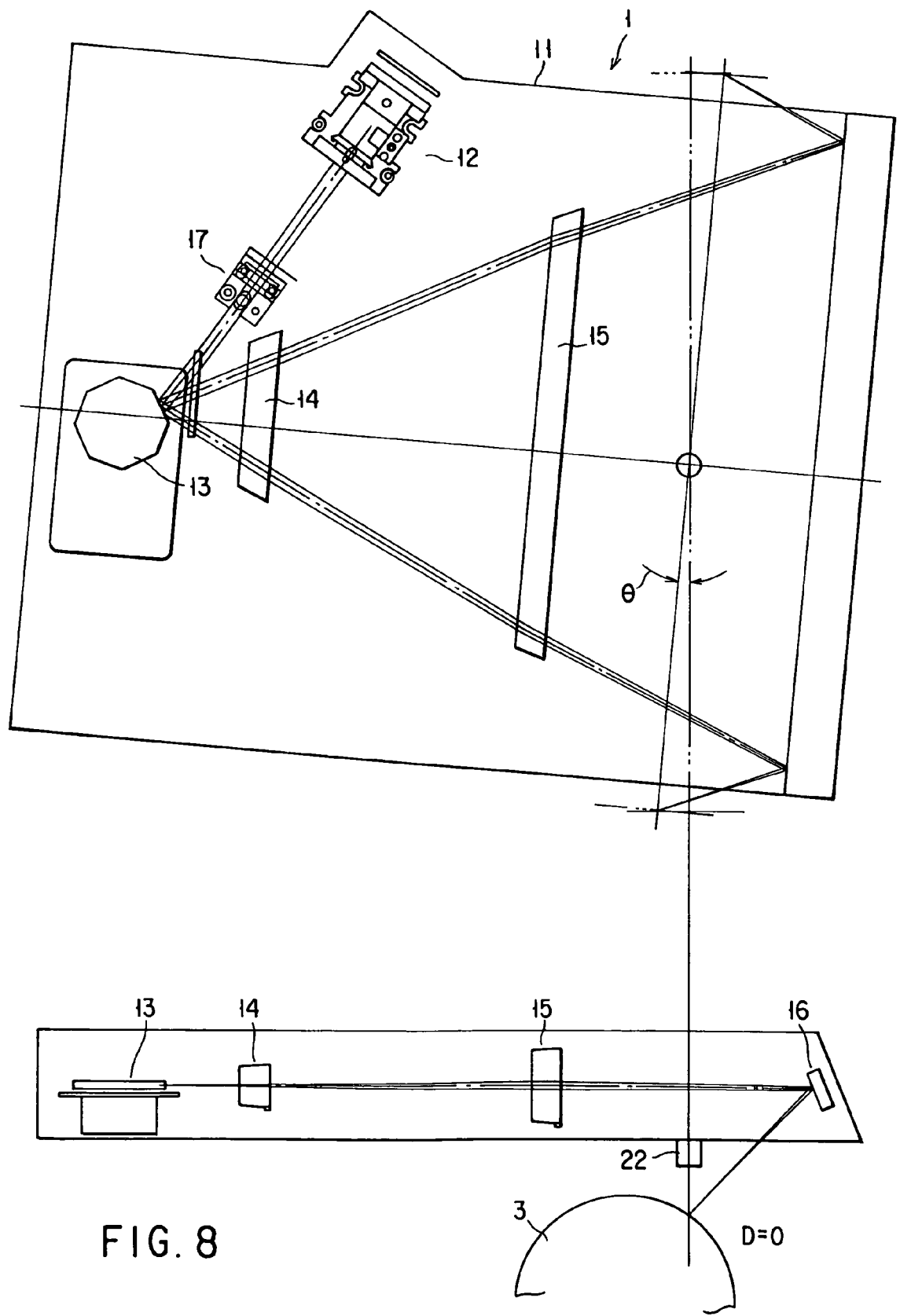
FIG. 8 is a view for explaining an amount of displacement of a scanning start position of an exposure light spot when the rotation shaft of the exposure device is set on an axis passing through the exposure light spot.

Where, for example, the rotation shaft O is located at a position illustrated in FIG. 7, that is, at a position spaced apart by a distance D of 50 mm relative to the exposure light spot S, it follows that, if the tilt of the exposure light spot S corresponding to an angle θ=arctan 0.01=0.57 deg is corrected by rotating the exposure device 1, the scanning start position of the exposure light spot S is displaced toward the main scanning direction by an amount of Y=0.49 mm. In contrast, where, according to the embodiment shown in FIG. 8, the rotation shaft O, that is, the dowel 22, is located on an axis passing through the exposure light sport S, it follows that, even if the tilt of the exposure light spot S corresponding to the same angle θ=arctan 0.01=0.57 deg as set out above is corrected, the amount of displacement, Y, of the scanning start position becomes 0.007 mm and there is almost no displacement along the main scanning direction.

As set out above, according to the present invention, the dowel 22 (rotation shaft) projecting from the bottom of the housing 11 of the exposure device 1 was located on the axis passing through the exposure light spot S formed on the surface of the photosensitive drum 3 by the scanning of the laser beam. By such a simpler structure, it is possible to suppress, to a minimal extent, any displacement of the scanning start position of the exposure light spot in the main scanning direction when the exposure device 1 is rotated so as to correct the tilt of the exposure light spot, and it is not necessary to adjust the exposure light spot in the main scanning direction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Although, in the above-mentioned embodiment for example, the dowel 22 is so provided as to project from the bottom of the housing 11 of the exposure device 1 and the associated hole is so provided on the frame side of the copier as to rotatably receive the dowel 22, the present invention is not restricted to such a rotation structure. The rotation structure of the exposure device 1 may take any given form. For example, it may be possible to provide a dowel on the frame side of the copier and an associated hole on the housing 11 side of the exposure device.

What is claimed is:

1. An image forming apparatus comprising:
   an image carrier moved in a sub-scanning direction;
   an exposure device which scans, with an exposure light, the image carrier along a main scanning direction to form a latent image on the image carrier;
   a developing unit which supplies a toner to the latent image to effect development;
   a transfer unit which transfers a toner image to a sheet, and
   a fixing device which fixes the transferred toner image to the sheet, wherein
   the exposure device comprises:
      a housing;
      a light emitting section which emits a laser beam;
      a polygon mirror provided in the vicinity of a side in the housing, which includes a plurality of reflection planes along the main scanning direction to deflect the laser beam in the main scanning direction;
      a mirror provided in the vicinity of another side in the housing, which reflects the laser beam deflected by the polygon mirror at a predetermined angle to guide the laser beam outside the housing; and
      a projection provided on an outer surface of the housing between the polygon mirror and the mirror,
      wherein a central axis of the projection passes through an exposure light spot of the laser beam irradiated on the image carrier.

2. The image forming apparatus according to claim 1 further comprising:
   a frame having a hole into which the projection is fitted, which supports the housing of the exposure device in such a manner that the housing can rotate about the projection.

3. The image forming apparatus according to claim 1, further comprising:
   a correction lens which corrects variations in the tilts of the plurality of reflection planes.

4. The image forming apparatus according to claim 3, wherein the correction lens comprises two fθ lenses.

5. The image forming apparatus according to claim 4, wherein the housing is rotated about the projection.

6. The image forming apparatus according to claim 1, further comprising:
   a shaping lens located between the light emitting section and the polygon mirror.

7. The image forming apparatus according to claim 6, wherein at least the light emitting section and the shaping lens are formed in one unit.

8. An exposure apparatus comprising:
   a housing;
   a light emitting section which emits a laser beam;
   a polygon mirror provided in the vicinity of a side in the housing, which includes a plurality of reflection planes along a main scanning direction to deflect the laser beam in the main scanning direction;
   a mirror provided in the vicinity of another side in the housing, which reflects the laser beam deflected by the polygon mirror at a predetermined angle to guide the laser beam outside the housing; and
   a projection provided on an outer surface of the housing between the polygon mirror and the mirror,
   wherein a central axis of the projection passes through an exposure light spot of the laser beam which is reflected by the mirror.

9. The exposure apparatus according to claim 8 further comprising:
   a correction lens which corrects variations in the tilts of the plurality of reflection planes.

10. The exposure apparatus according to claim 8, wherein the housing is rotated about the projection.

11. The exposure apparatus according to claim 8, further comprising:
    a shaping lens located between the light emitting section and the polygon mirror.

12. The exposure apparatus according to claim 11, wherein at least the light emitting section and the shaping lens are formed in one unit.

13. An image forming apparatus comprising:
    an image carrier moved in a sub-scanning direction;
    an exposure means for scanning, with an exposure light, the image carrier along a main scanning direction to form a latent image on the image carrier;
    a developing means for supplying a toner to the latent image to effect development;
    a transfer means for transferring a toner image to a sheet, and
    a fixing means for fixing the transferred toner image to the sheet, wherein the exposure means comprises:
- a housing;
- a light emitting means for emitting a laser beam;
- a deflection means, provided in the vicinity of a side in the housing, which includes a plurality of reflection planes along the main scanning direction, for deflecting the laser beam in the main scanning direction;
- a reflecting means, provided in the vicinity of another side in the housing, for reflecting the laser beam deflected by the deflecting means at a predetermined angle to guide the laser beam outside the housing; and
- a projection provided on an outer surface of the housing between the deflecting means and the reflecting means,
- wherein a central axis of the projection passes through an exposure light spot of the laser beam irradiated on the image carrier.

14. The image forming apparatus according to claim 13 further comprising:
- a frame having a hole into which the projection is fitted, which supports the housing of the exposure means in such a manner that the housing can rotate about the projection.

15. The image forming apparatus according to claim 13, further comprising:
- a correction lens which corrects variations in the tilts of the plurality of reflection planes.

16. The image forming apparatus according to claim 13, wherein the correction lens comprises two fθ lenses.

17. The image forming apparatus according to claim 13, wherein the housing is rotated about the projection.

18. The image forming apparatus according to claim 13, further comprising:
- a shaping lens located between the light emitting means and the deflecting means.

19. The image forming apparatus according to claim 18, wherein at least the light emitting means and the shaping lens are formed in one unit.

20. An exposure apparatus comprising:
- a housing;
- a light emitting means for emitting a laser beam;
- a deflecting means, provided in the vicinity of a side in the housing, which includes a plurality of reflection planes along a main scanning direction, for deflecting the laser beam in the main scanning direction;
- a reflecting means, provided in the vicinity of another side in the housing, for reflecting the laser beam deflected by the deflecting means at a predetermined angle to guide the laser beam outside the housing; and
- a projection provided on an outer surface of the housing between the deflecting means and the reflecting means,
- wherein a central axis of the projection passes through an exposure light spot of the laser beam which is reflected by the reflecting means.

21. The exposure apparatus according to claim 20, further comprising:
- a correction lens which corrects variations in the tilts of the plurality of reflection planes.

22. The image forming apparatus according to claim 20, wherein the housing is rotated about the projection.

* * * * *